United States Patent [19]
Bridger et al.

[11] 3,938,895
[45] Feb. 17, 1976

[54] METHOD FOR POSITIONING AN OPTICAL FIBER

[75] Inventors: Andrew Bridger, Brighton; Mark L. Dakss, Waltham, both of Mass.

[73] Assignee: GTE Laboratories Incorporated, Waltham, Mass.

[22] Filed: Aug. 19, 1974

[21] Appl. No.: 498,804

[52] U.S. Cl............... 356/152; 356/153; 350/96 C; 250/227
[51] Int. Cl.²........................................ G01B 11/26
[58] Field of Search........... 356/152, 153; 350/96 C; 250/227

[56] References Cited
UNITED STATES PATENTS

| | | | |
|---|---|---|---|
| 3,297,875 | 1/1967 | Garwin et al. | 250/199 |
| 3,628,036 | 12/1971 | Humphrey | 350/96 B |
| 3,800,388 | 4/1974 | Borner et al. | 350/96 C |

*Primary Examiner*—Maynard R. Wilbur
*Assistant Examiner*—S. C. Buczinski
*Attorney, Agent, or Firm*—Irving M. Kriegsman; Bernard L. Sweeney

[57] ABSTRACT

A method is described for positioning an optical fiber. The method takes two general forms: (1) The optical fiber is positioned carefully with respect to some predetermined external surface on a stationary holder such that the optical fiber may be later precisely located through use of that surface; and (2) Precisely orienting one or more optical fibers which have been prepositioned with respect to an article such that that article may be similarly precisely oriented. Generally, the methods involve the passing of light through the optical fiber, detecting the output therefrom through the use of a position-sensitive photodetector, and moving the optical fiber so as to achieve a desired relationship to the position-sensitive photodetector.

5 Claims, 4 Drawing Figures

METHOD FOR POSITIONING AN OPTICAL FIBER

BACKGROUND OF THE INVENTION

The present invention is related generally to methods for positioning optical fibers and is more particularly concerned with such methods which may be performed automatically with a high degree of accuracy.

A recent development in communicaton systems involves the use of optical fibers for very high bandwidth communication channels. The use of such optical fibers, which carry light energy distributed over a small area, has lead to a need for a device which can conveniently and efficiently optically couple a pair of such optical fibers to each other. The difficulty in accomplishing this end is directly attributable to the cross sectional dimensions of the optical fibers. The dimensions of the light carrying portions of the typical optical fiber are on the order of 50 micrometers.

The coupling of optical fibers involves generally precise mechanical control of the alignment of the optical fibers to achieve low coupling losses. Furthermore, for such optical communication systems to be of general utility, the couplers associated therewith must be such as to be adaptable to use in the field. Therefore, the couplers must be rugged, yet simple in construction so as to provide physical protection of the actual optical fibers yet allow for quick and convenient operation of the coupling function.

Such a coupler and a connector for use therewith are disclosed and claimed in a separate patent application entitled "Optical Fiber Connector and Coupler" by Dakss et al., which is filed concurrently with the instant application and which has a common assignee. The optical fiber connector has external surfaces thereon which are finished accurately and which mate with other complimentary surfaces in the coupler body to enable the completed optical fiber coupler to establish highly efficient optical coupling between associated pairs of optical fibers. In one form of the optical fiber coupler, V-grooves are used to support and align the associated pairs of connectors.

In a second separate patent application entitled "Method and Apparatus for Forming Optical Fiber Connectors" by Dakss et al., which is also filed concurrently with the instant application and which has a common assignee, a method for assembling such optical fiber connectors is disclosed and claimed. This method provides for the accurate positioning of the optical fiber within the main body of the optical fiber connector. However, the method described therein is more suitable for manual performance and is not readily adaptable to an automated procedure as is desirable in an industrial environment.

SUMMARY OF THE INVENTION

It is, therefore, an object of the present invention to provide a novel method for forming optical fiber connectors which is readily adaptable to automatic processing of such fibers in an industrial environment.

It is another object of the present invention to provide such a novel method which is simple to perform and which does not require the development of sophisticated machinery or procedures.

It is a further object of the present invention, to provide a method for utilizing optical fibers which have been previously positioned with respect to an object for precisely aligning that object with respect to external datum lines.

Accordingly, the present invention in its broadest aspects comprises a method for positioning an optical fiber. The method includes the step of defining an axis. An optical fiber assembly is aligned essentially parallel with that axis. The optical fiber is positioned along the axis so that an end of the optical fiber is positioned approximately at a predetermined point on the axis. Light is passed through the optical fiber so that it exits from the end of the optical fiber. A position-sensitive photodetecting means is positioned on the axis so that the light exiting from the end of the optical fiber is incident thereon. The light is detected and a signal generated which is indicative of the position of the end of the optical fiber relative to the axis. The optical fiber is then moved normal to the axis in response to the signal until the optical fiber is coaxial with the axis.

These and other objects, advantages and features of the invention will be apparent with respect to the following detailed description of the preferred embodiment taken together with the accompanying drawing.

DETAILED DESCRIPTION OF THE PREFERRED EMBODIMENTS

Figure 1:
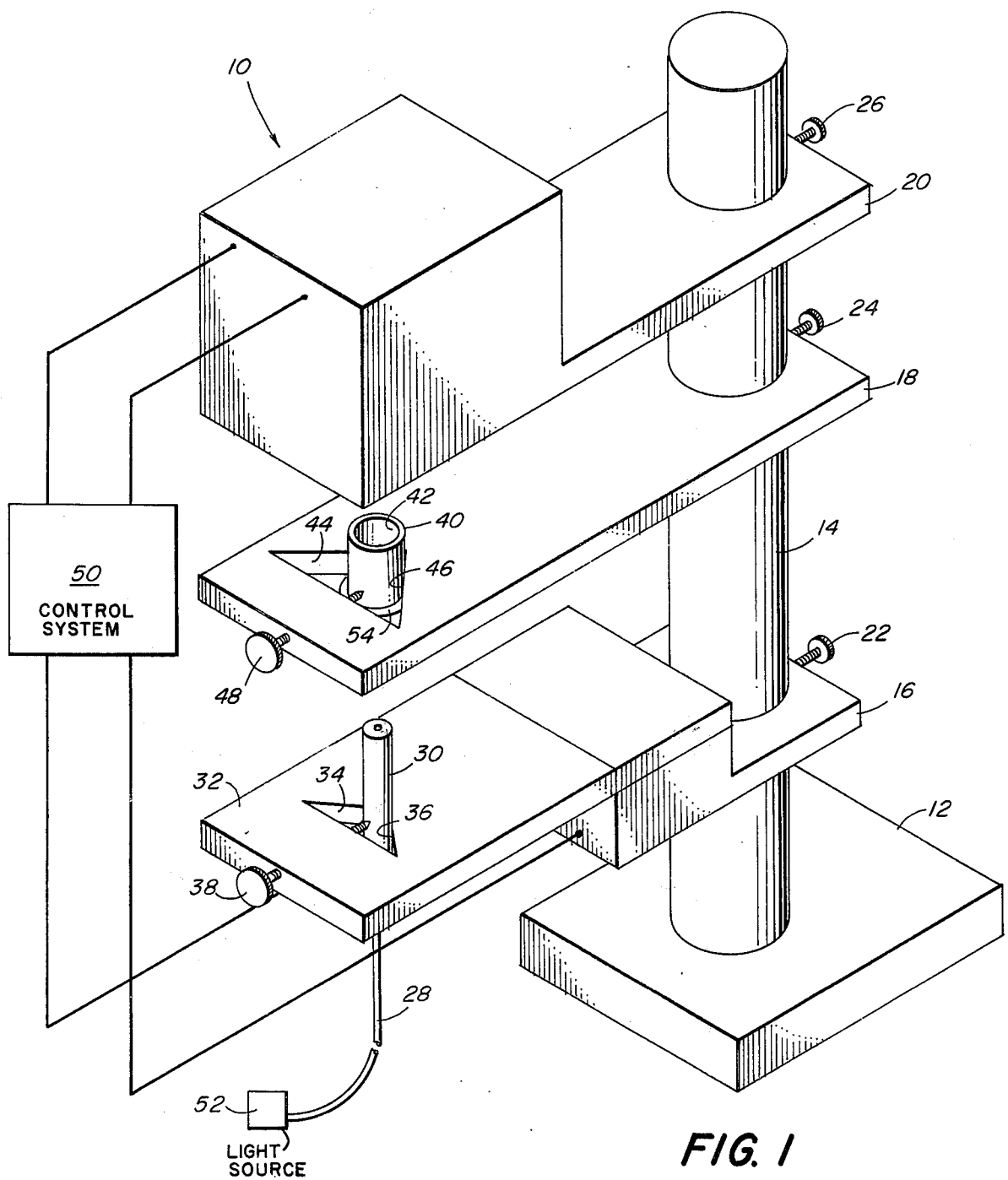
FIG. 1 is an isometric view of an instrument with which the method of the present invention may be performed.

In referring to several figures of the drawing hereinbelow, like reference numerals are used to refer to identical parts of the apparatus described.

Referring initially to FIG. 1, there is shown an apparatus for positioning an optical fiber which is identified generally by the reference numeral 10. In this embodiment, the apparatus 10 includes a base 12 on which a vertical support column 14 is mounted. The column 14 supports a number of assemblies successively along its length. The lowermost of these assemblies is an optical fiber translator 16. Above the optical fiber translator 16 is located an optical fiber holder fixture 18 and a position-sensitive photodetecting means 20. Each of the assemblies 16, 18 and 20 may be formed in a position along the support column 14 which is fixed at the time of manufacture or may be relatively movable and selective positionable along the column through the use of a means such as holding thumb screws 22, 24 and 26 respectively.

A typical optical fiber 28 is positioned in the optical fiber translator 16 by securing it either directly or preferably within an inner sleeve 30 in a V-groove having a pair of operative surfaces 34 and 36 which cooperate with a holding thumb screw 38. The inner sleeve 30 has an axial bore therethrough in which the optical fiber 28 is attached. The bore is slightly larger in diameter than the optical fiber so that the optical fiber 28 is held very close to the axis of the inner sleeve. The V-groove and the thumb screw are disposed in an optical fiber fixture plate 32 which is affixed to the optical fiber translator 16 so as to be movable in a plane generally perpendicular to the axis of the column 14. The optical fiber 28 is thereby also oriented parallel to that axis. The parallelism of the optical fiber 28 to the axis of the column is determined by the parallelism of the operative surfaces 34 and 36 to that axis.

The optical fiber holder fixture 18 includes means for orienting an optical fiber holder 40 in a predetermined position relative to the axis of the support column 14. Once again, the means chosen for the presently preferred embodiment is a V-groove within the fixture 18. The operative surfaces 44 and 46 of the V-groove are again parallel to the axis of the support column 14. A holding thumb screw 48 forces the optical fiber holder 42 firmly against operative surfaces 44 and 46 so as to position the optical fiber holder 40 in a precise relationship to the axis of the support column 14. Once the optical fiber holder 40 is positioned, an axis, parallel to the axis of the support column 14, is established along which it is desired to position the optical fiber 28. In the embodiment shown, that axis is established as the axis of the bore 42 in the optical fiber holder 40. The bore is of a size sufficient to allow the optical fiber 28 to be inserted therein. Furthermore by locating the optical fiber holder fixture 18 along the axis, a predetermined relationship may be determined between a second, lateral surface 54 on the optical fiber holder 40 so that the lateral surface 54 may be positioned relative to a predetermined point on the axis.

The position-sensitive photodetecting means 20 will be discussed in greater detail with reference to FIGS. 2 through 4 below; however, the general function of the means 20 is to provide a signal indicative of the position of the optical fiber 28 relative to the axis of the bore 42 to an electronic control system 50 which in turn provides a driving signal to the optical fiber translator 16 to align the optical fiber 28 with the axis. This function is accomplished by passing light through the optical fiber 28 from a light source 52 toward the photodetecting means 20. The light exits from the opposite end of the optical fiber 28 and is utilized by the position-sensitive photodetecting means 20 to generate the electrical signal which is provided to the electronic control system 50.

Means (not shown) are also included for positioning the optical fiber 28 along the axis so that the end of the optical fiber is approximately at a point on the axis. This positioning has several functions. Firstly, a definite relationship is defined relative to the lateral surface 54. Secondly, a definite relationship is defined relative to the position-sensitive photodetecting means so that greater accuracy may be achieved during alignment of the optical fiber 28 with the axis.

Figure 2:
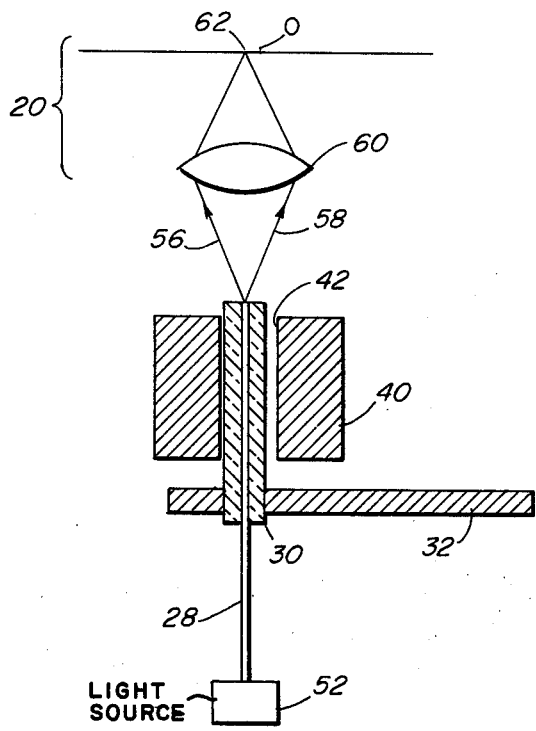
FIG. 2 is a schematic diagram of an exemplary optical system utilizable in performing the method of the present invention.

Referring now to FIG. 2 of the drawing wherein an exemplary position-sensitive photodetecting means 20 is shown, the optical fiber 28 emits light through its exit end in a cone defined by a pair of divergent rays 56 and 58. The divergency of the rays 56 and 58 is determined by the numerical aperture of the optical fiber 28. An optical system 60 is utilized to collect the rays in the cone and to focus those rays at a point 62 on the surface of a position-sensitive photodetector surface 64. The optical axis of the optical system 60 is coaxial with the axis of the bore 42. Generally, the position-sensitive photodetector 64 will be a planar detector, such as United Detector Technology, Inc. "Pin-Spot/4" four quadrant position photosensor which emits a signal indicative of the position of the spot of light 62 relative to some origin such as identified by the point 0. The point 0 is located at the intersection of the axis with the surface 64. When the signal from the photodetector 64 is applied to a servo system, such as the electronic control system 50 together with the translator 16 in FIG. 1, the optical fiber fixture plate 32 may be adjusted in position such that the focus of the rays exiting from the optical fiber 28 is made to coincide with the origin 0 on the photodetector surface 64. At this time the optical fiber 28 will be aligned with the axis of the bore 42 and the optical axis of the collecting optical system 60. If the optical fiber 28 is secured to the optical fiber holder 40 while in this position, a precise relationship is established between the optical fiber 28 and those surfaces of the optical fiber holder 40 which were disposed against the V-groove surfaces 44 and 46 during the procedure.

The accuracy of this embodiment is dependent on the positioning of the optical fiber 28 along the axis since that position defines the size of the "point" 62 on the surface 64. The larger the size, the lower is the inherent accuracy of the result. Preferably, the optical fiber 28 and the inner sleeve 30 are coterminated at their exit ends and are polished at that end so that light emitted from the optical fiber is not diffused by any imperfections in the end surface.

Figure 3:
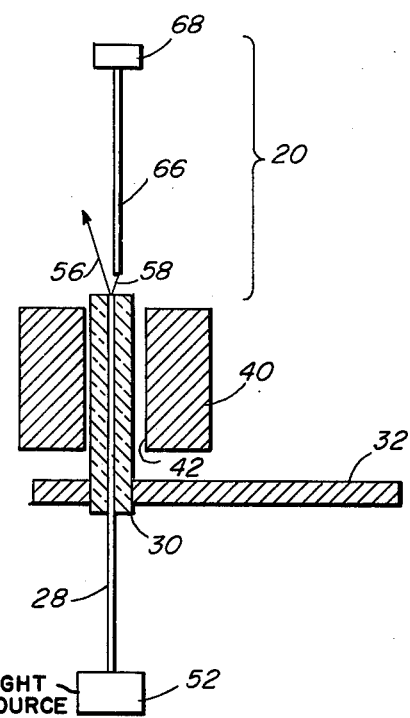
FIG. 3 is a schematic diagram, similar to that shown in FIG. 2, disclosing an alternative optical scheme for practicing the method of the present invention.

FIG. 3 shows a second embodiment for the position-sensitive photodetecting means 20. In this embodiment, a second, fixed optical fiber 66 is positioned in close proximity to the plane of the exit end of the optical fiber 28 and along the axis of the bore 42 of the optical fiber holder 40. Since there is a distribution of intensity across the cone defined by the pair of exit rays 56 and 58, when the optical fiber 66 has an end positioned directly in line with the optical fiber 28, the intensity of the light received by and coupled into the optical fiber 66 will be at a maximum. Therefore, by placing a photodetector 68, which need not be position-sensitive per se, at the opposite end of the fixed optical fiber 66, the magnitude of the signal generated by the photodetector 68 becomes indicative of the relative alignment of the optical fibers 28 and 66. Therefore, that amplitude sensitive signal from the photodetector 68 may be utilized to move the optical fiber 28 in its holding fixture plate 32 until precise alignment of the two fibers is accomplished. Thereafter, the optical fiber 28 may be affixed to the optical fiber holder 40. The accuracy of the positioning of the optical fiber 28 is a function of the proximity of the optical fiber 28 to the optical fiber 66. The closer the ends are to each other, the greater the accuracy.

In the embodiments shown in FIGS. 2 and 3, the optical fiber 28 is intended to be positioned precisely within a fixed holding member 40. The holding member 40 may be, as stated hereinabove, the main body to an optical fiber connector. However, any body in which it is desired that an optical fiber be positioned with respect to some external surface may be substituted for the optical fiber connector main body. Once the optical fiber 28, whether or not including the protective inner sleeve 30, is positioned as desired within the chosen body the optical fiber 28 is fixed in position by use of a suitable adhesive.

The light source 52 may take many forms within the purview of the invention. A light emitting diode, a laser, or an incandescent source may be utilized to provide a beam of light to the entrance and to the optical fiber 28. The only requirement for the source 52 is that the wavelength of emission be compatible with the response of the photodetector utilized to determine the position of the optical fiber relative to the axis.

Figure 4:
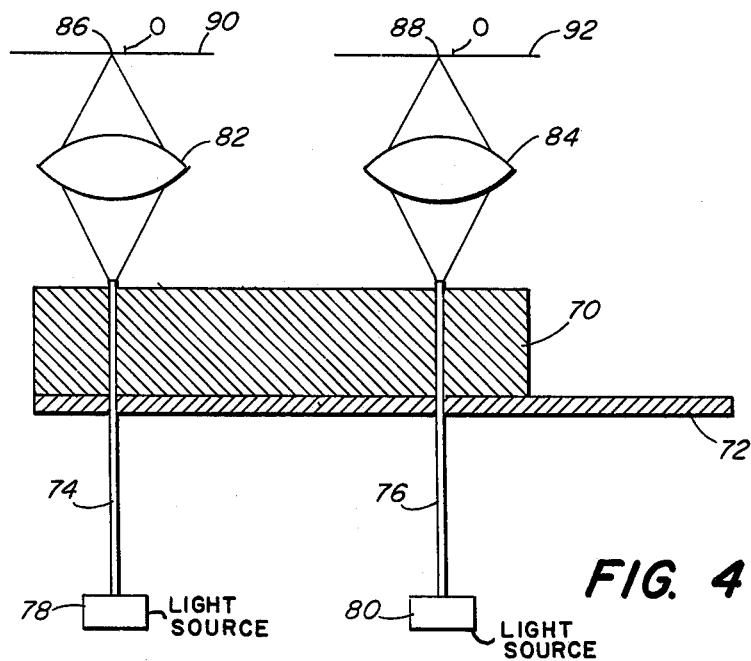
FIG. 4 is a schematic diagram of a system utilizable in orienting an object with respect to predetermined external datum information.

FIG. 4 shows a second utilization of the present invention. In this figure, a pair of essentially identical optical fiber systems and associated detection means are shown. The first system has an optical fiber 74 through which light is passed from a light source 78. Collecting optics 82 focuses the light from the optical fiber 74 at a spot 86 on a position-sensitive photodetecting surface 90. Similarly, the second optical fiber 76 emits light from a light source 80 through collecting optics 84 to a spot 88 on a second position-sensitive phtodetecting surface 92. In this embodiment, the optical fibers 74 and 76 have been previously precisely positioned and fixed within an object 70. The object 70 is attached to a means 72 for moving the object 70 within a plane normal to the axes of the fibers 74 and 76. A pair of axes are defined by the photodetecting means 90 and 92 and the collecting optics 82 and 84.

In this embodiment, the object 70 is precisely positioned by initially causing a first one of the optical fibers 74 or 76 to be precisely aligned with the associated axis as discussed hereinabove with respect to FIGS. 1 through 3. Thereafter, the object 70 is rotated about that aligned axis until precise alignment is attained for the second optical fiber with its associated axis. At this time, the object 70 is precisely positioned with respect to the pair of optical axes.

While there have been shown and described what are considered to be preferred embodiments of the present invention, it will be understood that various changes and modifications may be made therein by one of ordinary skill in the art without departing from the spirit of the invention as defined by the appended claims.

We claim:

1. A method for positioning an optical fiber in a holder for subsequent use in coupling a pair of similarly mounted optical fibers together, the method comprising the steps of defining an axis,
   positioning an optical fiber holder main body such that a first external surface thereof is in a predetermined relationship to the axis and a second external surface is in another predetermined relationship to a point on the axis,
   aligning an optical fiber essentially parallel with the axis,
   positioning the optical fiber along the axis so that the optical fiber is in juxtaposition to the main body over a portion of its length and an end of the optical fiber is at a position approximately at the point on the axis,
   passing light through the optical fiber so that light exits from the end of the optical fiber,
   positioning a position-sensitive photodetecting means on the axis so that the light exiting from the end of the optical fiber is incident thereon,
   detecting the light,
   generating a signal indicative of the position of the end of the optical fiber relative to the axis,
   moving the optical fiber normal to the axis in response to the signal until the optical fiber is coaxial with the axis, and
   securing the optical fiber to the main body to form an optical fiber holder in which the position of the optical fiber is in a known relationship to at least two external surfaces thereby allowing for precise positioning of the optical fiber.

2. A method according to claim 1, wherein light exiting from the end of the optical fiber forms a divergent beam of light, the position-sensitive photodetecting means has a detector plane disposed orthogonal to the axis, and the step of detecting the light includes the step of focusing the divergent beam of light onto the detector plane so that the signal generated is indicative of the position of the focus of the beam of light on the detector plane.

3. A method according to claim 1, wherein prior to aligning the optical fiber essentially parallel with the axis, the additional step of fixedly placing the optical fiber in a bore in a rigid inner sleeve is performed.

4. A method according to claim 3, wherein the end of the optical fiber is at an end of the inner sleeve and the additional step of polishing the ends of the optical fiber and inner sleeve is performed.

5. A method for positioning an object comprising the steps of mounting a pair of optical fibers in a predetermined parallel spaced relationship on the object, a first end of each of the optical fibers being disposed adjacent to a surface of the object,
   defining a pair of similarly spaced parallel axes, each axis being associated with one of the optical fibers,
   positioning the object such that the optical fibers are essentially parallel to the axes and such that the first ends of the optical fibers are in a predetermined relationship to a point on an axis.
   passing light through each of the optical fibers so that light exits from the first end of the optical fibers,
   positioning a position-sensitive photodetecting means on each of the axes so that the light exiting from the first ends of the optical fibers are incident respectively thereon,
   detecting the light at a first one of the position-sensitive photodetecting means,
   generating a signal indicative of the position of the first end of the associated optical fiber relative to the associated axis,
   translating the object in a plane normal to the axis until the associated optical fiber and axis are aligned,
   detecting the light at the other of the pair of position-sensitive photodetecting means,
   generating a signal indicative of the position of the first end of the associated optical fiber relative to the associated axis, and
   rotating the object about the axis associated with the first one of the pair of position-sensitive photodetecting means until the associated optical fiber and axis are aligned thereby precisely orienting the object relative to the pair of axes.

* * * * *

UNITED STATES PATENT OFFICE
CERTIFICATE OF CORRECTION

PO-1050 (5/69)

Patent No. 3,938,895    Dated February 17, 1976

Inventor(s) Andrew Bridger and Mark L. Dakss

It is certified that error appears in the above-identified patent and that said Letters Patent are hereby corrected as shown below:

Column 1, line 13, delete "lead" and insert therefor --led--

Column 1, line 38, delete "complimentary" and insert therefor --complementary--

Column 6, line 39, delete "." and insert therefor --,--

Signed and Sealed this eleventh Day of May 1976

[SEAL]

Attest:

RUTH C. MASON
Attesting Officer

C. MARSHALL DANN
Commissioner of Patents and Trademarks